United States Patent [19]

Eddy

[11] 3,961,309

[45] June 1, 1976

[54] HIGH-LOW TIRE PRESSURE SIGNAL SWITCH

[75] Inventor: William C. Eddy, Columbus, Ohio

[73] Assignee: Aspro, Incorporated, West Port, Conn.

[22] Filed: June 18, 1975

[21] Appl. No.: 587,994

Related U.S. Application Data

[63] Continuation-in-part of Ser. No. 567,533, April 14, 1975.

[52] U.S. Cl. ................................ 340/58; 200/61.25

[51] Int. Cl.² ........................................... B60C 23/02

[58] Field of Search .................... 340/52 R, 58, 238; 200/61.22, 61.25; 116/34

[56] References Cited

UNITED STATES PATENTS

| | | | |
|---|---|---|---|
| 3,296,590 | 1/1967 | Dalton | 340/58 |
| 3,430,196 | 2/1969 | Dalton | 340/58 |
| 3,537,068 | 10/1970 | Amundsen, Jr. | 340/58 |
| 3,588,813 | 6/1971 | Robinson | 340/58 |

*Primary Examiner*—Alvin H. Waring
*Attorney, Agent, or Firm*—Frease & Bishop

[57] ABSTRACT

An air pressure-controlled electrical switch responsive to a change of pressure either above or below a predetermined desired pressure in a vehicle tire, to actuate a magnetically activated system for signaling such tire pressure change. The switch has piston means subject to one end to air pressure in a tire. The piston means is movable from an intermediate position where it normally is maintained by spring pressure and an opposed force imparted by the predetermined desired internal tire pressure which act in opposition on the piston means. The switch is actuated by movement of the piston means in one direction or the other from the intermediate position. The switch is normally closed when the piston means is in the intermediate position. The switch opens when the piston moves in one direction or the other from the intermediate position upon increase or reduction of the tire pressure from the predetermined desired value. The switch is connected electrically with a magnetically activated electronic signaling system.

14 Claims, 12 Drawing Figures

HIGH-LOW TIRE PRESSURE SIGNAL SWITCH

CROSS-REFERENCE TO RELATED APPLICATION

This application is a continuation-in-part of and involves improvements upon the devices shown in my copending application entitled TIRE PRESSURE SIGNAL SWITCH, filed Apr. 14, 1975, Ser. No. 567,533.

BACKGROUND OF THE INVENTION

1. Field of the Invention

The invention relates to an electrical switch for indicating pressure change in a vehicle tire from a predetermined value, either above or below the predetermined value; the switch being normally closed when the predetermined desired tire pressure exists within the tire, and opening when the tire pressure is increased or reduced from the predetermined value, for actuating an induction or magnetically activated signaling system to provide a signal to the vehicle operator of the changed tire pressure condition.

The improved switch construction may activate an induction signal system such as shown in Brown U.S. Pat. No. 3,093,812, or in my copending application Ser. No. 567,533.

2. Description of the Prior Art

Many vehicle tire pressure signaling systems have been proposed. The operation of a number of prior systems depends upon receiving an indication of change in tire pressure within a vehicle tire. The indication of such changed tire pressure condition normally is given by a pressure-responsive switch. Various switches of the diaphragm, bellows or piston types have been used.

Also, some of such prior art switches have contemplated indicating a change in tire pressure either above or below certain predetermined ranges, as in Arvan U.S. Pat. No. 3,593,268.

Prior art switches for tire pressure signaling systems, including the device shown in U.S. Pat. No. 3,593,268, have had many undesirable features, characteristics or drawbacks, being high in cost, having a large number of delicate parts or components, using adjusting means to calibrate the switch for the predetermined tire pressure, and in the case of U.S. Pat. No. 3,593,268 having a contactor assembly comprising a large number of contactor parts including associated telescoping cups, one of which is movable from a first contact position to a second contact position and which is actuated by a push rod extending from a piston that is subjected to the internal tire pressure.

These difficulties or drawbacks, among others, and the relatively high cost of prior devices, seem to have delayed or retarded the adoption and desirable use of tire pressure signaling devices for automobile tires, and particularly of devices used to indicate change in tire pressure to one above or below the predetermined tire pressure desired to be maintained in the tire.

Thus, there has existed and still exists a need, particularly in the field of pleasure, business and commercial vehicles and the like, for air pressure-controlled electrical switches to indicate when tire pressure has been increased above or reduced below a predetermined level which it may be desired to be maintained in the tire so as to provide for highway operation of vehicles with security as regards tire pressure, at a minimum cost for the signaling systems.

SUMMARY OF THE INVENTION

Objectives of the invention include providing a new pressure-actuated electrical switch for actuating an induction or magnetically activated signaling system to indicate change in tire pressure to a value either above or below a predetermined pressure desired to be maintained in the tire, which switch is low in cost, which operates accurately under high gravity loading, which is unaffected by or operates accurately under high road temperature conditions, and also which is unaffected by forces which can cause catastrophic rupture of diaphragm or bellows-type switches. A further objective of the invention is to provide a new tire pressure signal switch construction which achieves the stated objectives in a safe, easy and inexpensive manner and which assists in solving problems and satisfying needs that have long existed in the tire pressure signaling art.

These and other objects and advantages may be obtained by the new switch construction, the general nature of which may be stated as including in a vehicle tire pressure signaling system of a type in which magnetically activated alarm circuit means is actuated by a pressure switch communicating with the interior of the tire upon the occurrence of tire pressure changed from a predetermined desired value; the pressure switch including pressure cylinder means; O-ring sealed piston means axially movable in said cylinder means having pressure and switch ends; means for mounting the cylinder means on a tire rim with the pressure end of each of the piston and cylinder means communicating with the interior of a rim-mounted tire to subject said piston means pressure end to tire pressure; plug means closing the other end of the cylinder means; spring means reacting between the piston means and plug means normally biasing the piston means toward said pressure end of the cylinder; switch contact means mounted on the plug means operably engageable with the switch end of the piston means to establish switch "closed" position when the piston means is subjected to predetermined desired tire pressure; the piston means being movable in one direction or the other from said intermediate position upon occurrence of tire pressure above or below said predetermined desired tire pressure value to establish switch "open" position of said switch contact means; and the switch contact means being adapted for electrical connection with circuitry of a magnetically activated signaling system.

BRIEF DESCRIPTION OF THE DRAWINGS

Preferred embodiments of the invention — illustrative of the best modes in which applicant has contemplated applying the principles — are set forth in the following description and shown in the drawings and are particularly and distinctly pointed out and set forth in the appended claims.

Similar numerals refer to similar parts throughout the various figures of the drawings.

DESCRIPTION OF THE PREFERRED EMBODIMENTS

First Embodiment

Figure 1:
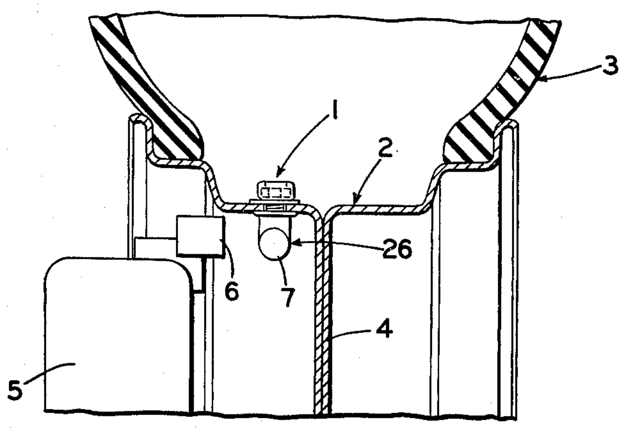
FIG. 1 is a somewhat diagrammatic sectional view through a portion of a conventional tire, rim and fixed vehicle member on which a brake is mounted, illustrating the assembly of the improved switch construction and associated wheel and vehicle elements.

One form of improved switch unit is generally indicated at 1 in FIGS. 1 through 6. The unit 1 may be mounted to extend through the wheel rim 2 of an automotive vehicle, the tire being generally indicated at 3. The wheel also may include a wheel disc 4 on which the rim 2 is mounted. A disc caliper member 5 is mounted on a non-rotatable vehicle member which may extend from a wheel axle, the member 5 being non-rotatable.

Fixed member 5 carries receiver means, generally indicated at 6, located close to the path through which transmitter means 7 rotates during motion of the vehicle. The transmitter means 7 preferably may form part of the switch unit 1 as described below and as illustrated diagrammatically in FIGS. 2, 3 and 6.

The switch unit 1, receiver means 6, and transmitter means 7 may form part of an induction or magnetically activated signaling system of the type shown in Brown U.S. Pat. No. 3,093,812 and diagrammatically illustrated in FIG. 6.

The switch 1 includes a cylinder housing 8 which may be formed with a shoulder 9 seated against a gasket 10 engaging a portion 11 of the rim 2. The cylinder housing 8 has a reduced threaded hollow stem 12 extending through an opening in the rim member 11 and may be assembled with the rim by a lock washer 13 and nut 14. The inner end 15 of the opening 16 formed in the hollow stem 12 communicates with the interior of tire 3 mounted on the rim 11. A filter 17 held by a filter cap

18 may cover the inner end 15 of the stem opening 16 to prevent dust, dirt and other foreign objects or materials from entering the interior of the cylinder housing 8.

The cylinder housing 8 is formed with a cylinder bore 19 below the shoulder 9 and stem 12, and the bore 19 communicates at reduced position 20 with the stem opening 16. Piston means 21 having a head 22 and a piston rod 23 is movably mounted in cylinder bore 19 sealed by the O-ring, piston ring 24. The piston head 22 is subject to the interior pressure in tire 3 when the unit 1 is mounted as shown in FIG. 1.

The outer end of cylinder bore 19 is internally threaded to receive the threaded closure plug portion 25 of T-shaped block 26. Member 26 is cast or molded of plastic or other encapsulating material that is electrically non-conductive. The block plug portion 25 has an internal bore 27, axially aligned with the cylinder bore 19.

A pair of spaced switch contactor commutator rings 28 and 29 is mounted in plug bore 27. Conductors 30 and 31 are embedded in the T-head 32 of block 26, connected, respectively, to the rings 28 and 29. A reed switch 33 and inductor coil 34 also are mounted or embedded in block T-head 32 (FIGS. 2 and 6); and wires 35 and 36, respectively, connect the reed switch to conductors 30 and 31. Inductor coil 34 also is electrically connected at 37 and 38, respectively, to conductors 30 and 31 and thus coil 34 is connected in parallel with the reed switch 33 in the transmitter means circuit 7.

The lower or outer end of piston rod 23 is formed with a reduced neck 39, and a vent opening 40 is formed in T-head 26 so that the lower piston head surface **21*a* is subject to atmospheric pressure. A spring 41 reacting between lower piston head surface 21*a* and plug 25 provides means to bias the piston means 21 toward the cylinder housing stem 12**.

Figure 3:
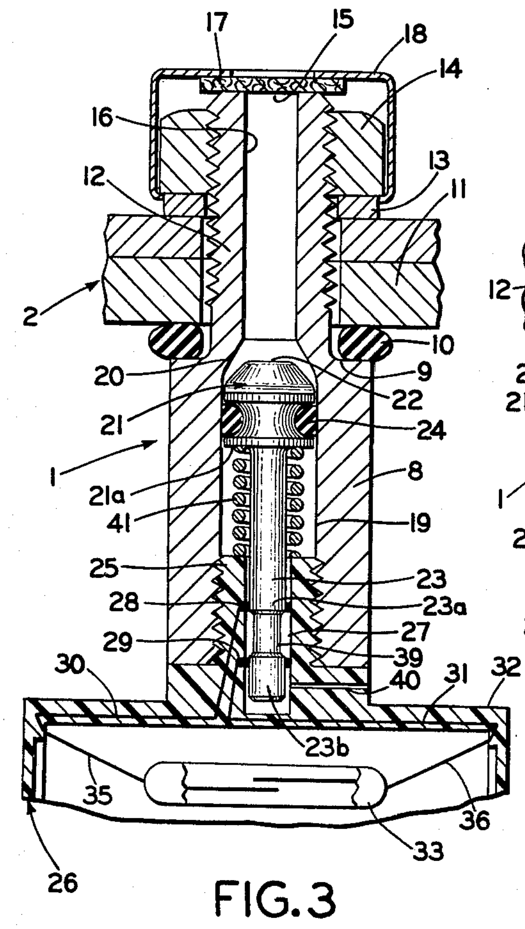
FIG. 3 is an enlarged sectional view of one form of improved switch construction in the normally closed position associated with normal tire pressure having the predetermined desired value.

Spring 41 is calibrated so that when the internal tire pressure has the predetermined desired value, the parts of the unit 1, mounted as shown in FIG. 1, are in the position shown in FIG. 3. At this time, the piston rod portion **23*a* just above reduced neck 39 contacts contactor ring 28, and the piston rod portion 23*b* just below reduced neck 39 contacts contactor ring 29** so that the switch means provided by the described components is in the normally "closed" position.

Figure 4:
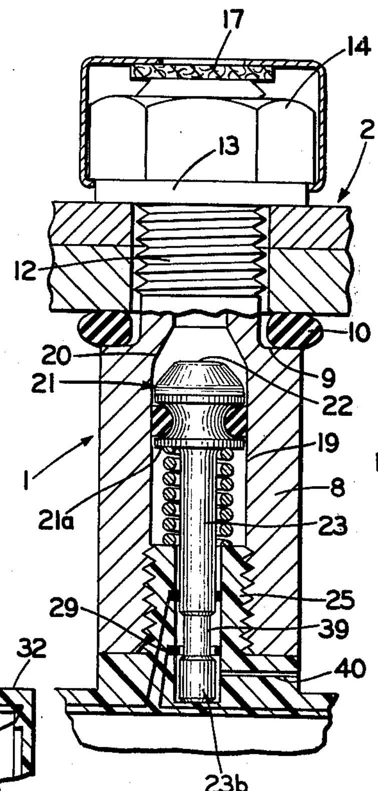
FIG. 4 is a view similar to FIG. 3, but showing the switch actuated to "open" position upon the occurrence of tire pressure above a predetermined desired value.

In operation, when the tire pressure is increased to above the predetermined desired value range, the piston means 21 moves down to the position shown in FIG. 4. At this time, the piston rod portion **23*b* breaks contact with contactor ring 29**, and the switch means thus opens.

Figure 5:
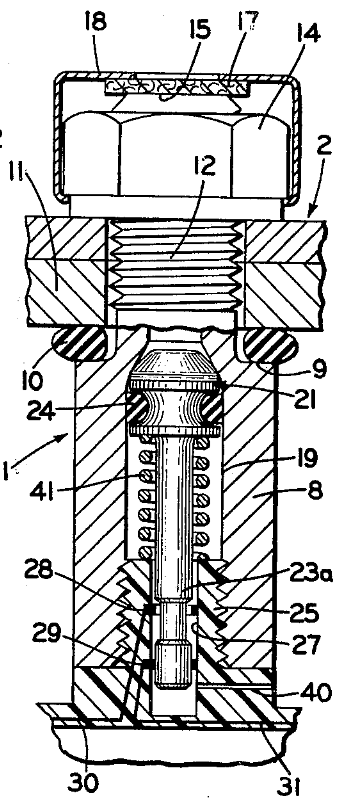
FIG. 5 is a view similar to FIGS. 3 and 4 but showing the switch actuated to another "open" position upon the occurrence of tire pressure below the predetermined desired value.

Similarly, when the tire pressure reaches a deflated condition below the predetermined desired value range, the piston means 21 moves up to the position shown in FIG. 5. At this time, the piston rod portion **23*a* breaks contact with contactor ring 28**, and the switch means thus opens.

Figure 2:
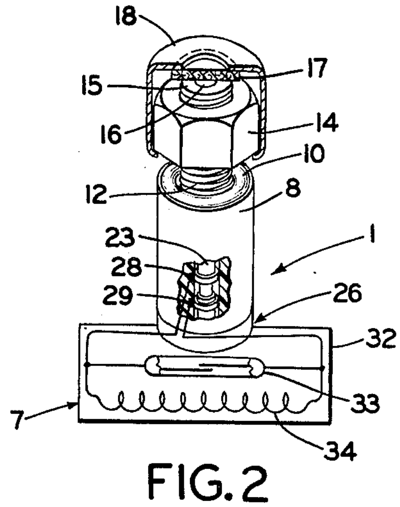
FIG. 2 is a diagrammatic perspective view of one manner of installing one of the improved switches.

The improved tire pressure signal switch unit 1, in accordance with the concepts of the invention, may be used in the system of the Brown U.S. Pat. No. 3,093,812, or may be used in a vehicle tire pressure signaling system such as illustrated diagrammatically in FIG. 6 wherein the transmitter means 7 includes the switch means (pressure switch) which is normally closed (but shown open), a reed switch 33 which is normally open, and an inductor coil 34. The contactor switch means 23$a$, 23$b$, 28 and 29, reed switch 33 and inductor coil 34 are connected as an assembly, as shown in FIGS. 2, 3 and 6.

The unit 1 may be mounted on the rim 2. Circuitry is connected as shown in FIG. 6. Thus, the switch means and transmitter means 7 may be formed in any manner as a single unit and mounted on the rim 2 as part of the moving body or wheel connected as shown at the left-hand portion of FIG. 6, and in FIG. 2.

The receiver means 6 mounted at a fixed or non-rotative position on the vehicle, may include a magnet 42 to create a magnetic field, an inductor coil 43, and means for amplifying current induced in the induction coil 43 to energize an alarm A which may be a visible or an audible signal. The amplifying means may include a silicon-controlled-rectifier (SCR) which is a three-terminal transistor that turns on when there is a few microampere control current induced in inductor coil 43.

Figure 6:
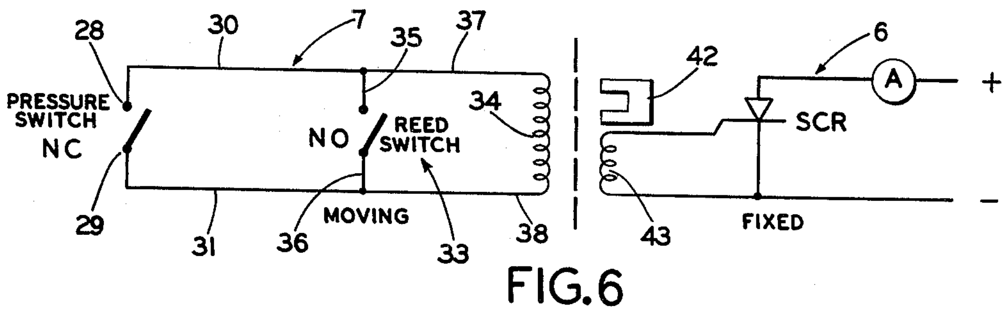
FIG. 6 is a diagrammatic view illustrating a magnetically activated signaling system which is actuated by the improved tire pressure signal switch.

The circuit on the vehicle shown in the right-hand (fixed) portion of FIG. 6 may be energized by the vehicle battery. Once the SCR is turned on, it latches and remains on and closes the circuit to the alarm device A which may be mounted on the dashboard of the vehicle. The SCR remains "on" until the vehicle ignition switch is turned off.

In operation, so long as the switch means remains closed, with normal tire pressure in the tire 3, no signal is given. However, whenever the switch means in pressure switch unit 1 opens by tire pressure changing to below or above the predetermined desired value, and as the moving wheel inductor coil 34 passes fixed magnet 42, coil 34 develops a voltage as it moves through the field of magnet 42. At the same time the reed switch 33 closes as the transmitter means 7 passes the receiver means magnet 42.

The closing of the reed switch 33 when it is just opposite magnet 42, creates a great rate-of-change of magnetic flux through inductor 34. This rapidly changing flux or a portion thereof is picked up by fixed inductor 43, producing a slight microampere control current which turns on SCR that in turn energizes the alarm signal A.

The construction of switch 1, in accordance with the concepts of the invention, provides an extremely low-cost device which may operate at a high gravity loading and under high road temperature conditions without sacrificing accuracy. Furthermore, there is no chance of catastrophic rupture to which prior diaphragm or bellows-type pressure switches are subject which could result in tire pressure failure without signaling and which has required prior switch devices to be protected at high cost and at the sacrifice of accuracy.

As indicated, the improved tire pressure signal switch 1 is low in cost because the various components thereof are simple in construction, design and assembly and yet provide an easily mounted, secure and protected device for the alarm system. Further, the piston-type switch of unit 1 requires no adjustment since the spring 41 is calibrated for the predetermined desired pressure, change from which is sensed and signaled.

Second Embodiment

Figure 7:
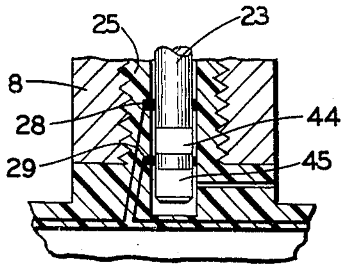
FIG. 7 is a fragmentary view similar to a portion of FIG. 3 showing a slightly modified form of construction with the switch in normally closed position associated with the predetermined desired tire pressure.
Figure 8:
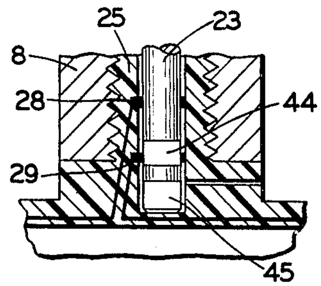
FIG. 8 is a view similar to FIG. 7 but showing the switch in "open" position upon the occurrence of tire pressure above the predetermined desired pressure.
Figure 9:
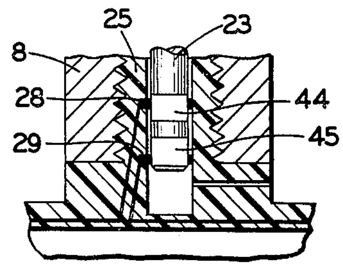
FIG. 9 is a view similar to FIGS. 7 and 8 but showing the switch actuated to "open" position upon the occurrence of tire pressure below a predetermined desired pressure.

The modified switch construction shown in FIGS. 7, 8 and 9 is the same as that illustrated in FIGS. 1 through 6 except that the lower end of piston rod 23 is provided with rings of nylon or other insulating material at 44 and 45, rather than the reduced neck 39.

As shown in FIG. 7, contactor rings 28 and 29 engage portions of piston rod 23 when the piston is in normal position with predetermined desired pressure in the tire. That is, the parts in FIG. 7 are in the same position and subject to the same conditions as in FIG. 3. Thus, the switch means (contactor rings 28 and 29 and rod 23) in FIG. 7 is in the normally closed position.

When tire pressure is increased (FIG. 8), piston rod 23 moves down and contactor ring 29 breaks contact with rod 23 and engages nylon ring 44. When tire pressure is reduced (FIG. 9), piston rod 23 moves up and contactor rings 28 and 29 break contact with rod 23 and engage nylon rings 44 and 45.

Third Embodiment

Figure 10:
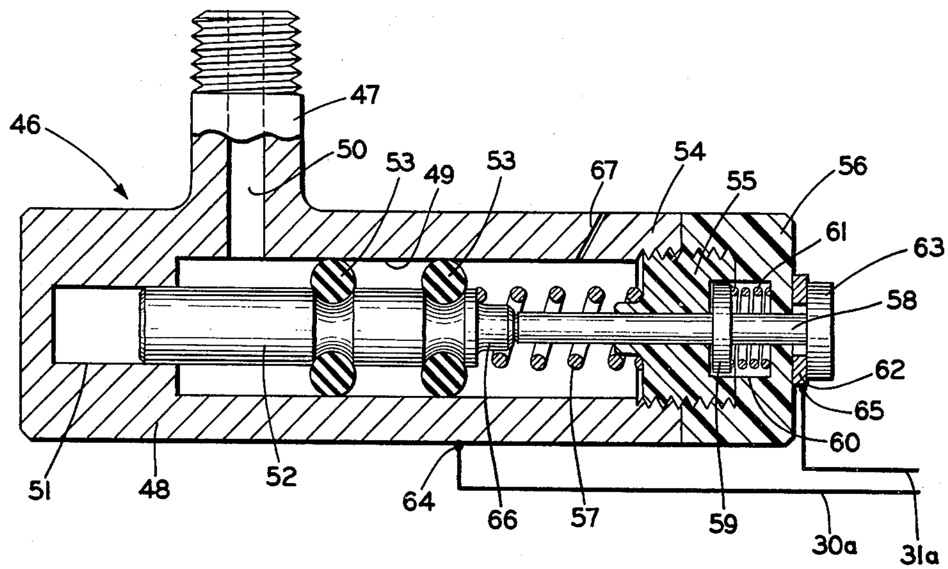
FIG. 10 is an enlarged view of a further modified form of construction with the switch in normally "closed" position associated with predetermined desired tire pressure.
Figure 12:
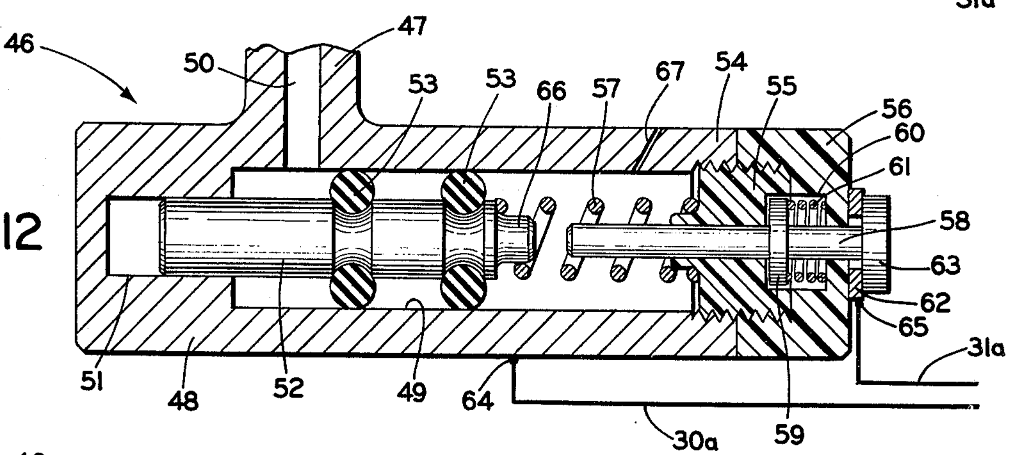
FIG. 12 is a view similar to FIGS. 10 and 11 but showing the switch actuated to "open" position upon the occurrence of tire pressure reduced below the predetermined desired value.
Figure 11:
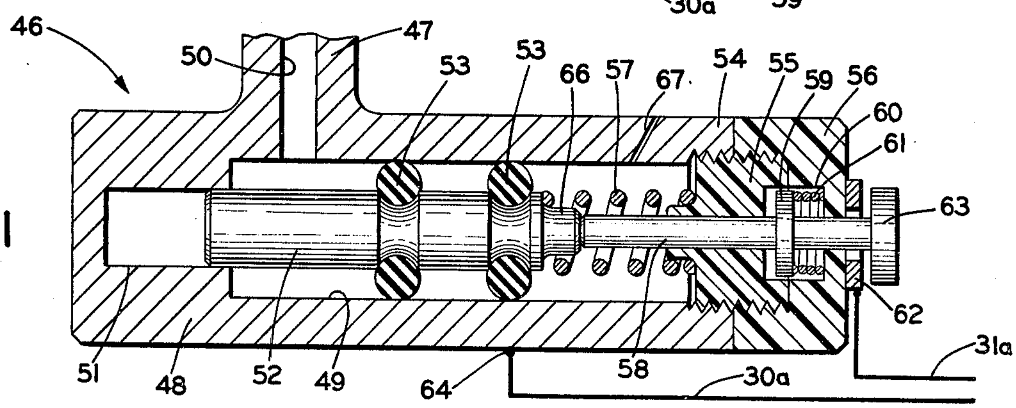
FIG. 11 is a view similar to FIG. 10 showing the switch actuated to "open" position upon the occurrence of tire pressure increased above the predetermined desired value.

Another modified construction of switch means responsive to tire pressure change is shown in FIGS. 10, 11 and 12, indicated generally at 46. The unit 46 has a threaded stem 47 which may be mounted on a wheel rim 2 similar to the mounting of unit 1 in FIG. 1. The switch unit 46 has a cylinder housing 48 with a cylinder bore 49 communicating with the stem opening 50. A reduced bore 51 communicates with one end of the cylinder bore 49 adjacent the stem opening 50. A piston 52 provided with axially spaced O-rings 53 is movably axially mounted in the cylinder bores 49 and 51, the piston means comprising the piston 52 and O-rings 53.

The open end 54 of the cylinder housing 48 is internally threaded and closed by an insulator plug 55. The plug 55 in turn is enclosed and locked in place by a plastic insulator cap 56.

A spring 57 reacts between the outer end of the piston 52 and the plug 55, biasing the piston 52 into reduced bore 51. A switch contactor rod 58 is mounted in and insulated from plug 55 and cap 56 and is axially aligned with piston 52 and axially movable with respect to cylinder housing 48.

The rod 58 has a flange 59 movable in a compartment 60 formed in adjacent portions of the plug 55 and cap 56. A spring 61 in compartment 60 engages flange 59 and cap 56, biasing the contactor rod 58 toward piston 52. A contactor ring 62 is engaged by rod head 63 and is fixed to the outer end of cap 56.

A conductor wire 30$a$ is connected to the housing 48 at 64 and another conductor 31$a$ is connected to contact ring 62 at 65. The conductor 30$a$ thus is electrically connected with piston 52 through housing 48 and piston engagement in bore 51; and conductor 31$a$ thus is electrically connected through ring 62 and rod head 63 with rod 58. A reduced boss 66 on the end of piston 52 is adapted to engage the inner end of contactor rod 58. Thus, elements 66, the inner end of rod 58, rod head 63 and contactor ring 62 become switch contacts for opening and closing the switch means in the manner described below.

The parts of the switch unit 46 are shown in FIG. 10 in their respective positions when the predetermined desired pressure is present in the tire mounted on a rim equipped with the unit 46. At this time, the boss 66 contacts contactor rod 58, and the switch is in a normally "closed" condition with the circuit completed through conductor 31$a$, contactor ring 62, rod head 63, rod 58, boss 66 and piston 52, cylinder housing 48 and conductor 30$a$. Conductors 30$a$ and 31$a$ correspond to conductors 30 and 31 in FIG. 6 when the switch unit 46 forms a part of the signaling system shown in FIG. 6.

When the tire pressure becomes increased (FIG. 11), piston 52 moves to the right as in FIG. 11, breaking contact between rod head 63 and contactor ring 62, thus opening the switch means. The contactor end of piston 52 and cylinder 49 are exposed to atmospheric pressure through vent 67.

When the pressure in the tire is reduced below the predetermined desired value (FIG. 12), piston 52 moves toward the left and contact is broken between boss 66 and the end of contactor rod 58, thus opening the switch means.

The switch unit 46, illustrated in FIGS. 10, 11 and 12, as well as the conductors 30*a* and 31*a*, may be incorporated in a single block construction from the standpoint of installation, such as shown in FIGS. 2 to 5. Thus, an insulating material block similar to T-shaped block 26 in which a reed switch and inductor coil are mounted, may form part of the plastic insulator cap 56 of the switch unit 46.

In General

The switch means sensing the degree of pressure in a tire in each of the three embodiments has a very simple construction of a housing forming a cylinder which communicates at one end with the interior of a tire through a threaded stem which may extend through a wheel rim on which the tire is mounted and clamped and sealed to the rim with simple typical nut and lock washer means.

A simple rod-like piston is mounted in the cylinder in each embodiment, normally biased toward one end of the cylinder by a spring calibrated to yield and hold the piston in an intermediate position in the cylinder when the predetermined desired pressure is present in the tire.

Contactor means in each embodiment is formed by and associated with portions of the outer end of the piston rod to provide a switch closed condition when the piston is in intermediate position, and to provide a switch open condition whenever the piston moves in either direction from said intermediate position upon tire pressure change either above or below the predetermined value.

The switch contactors also are simple in construction and operation involving a minimum of components, which also characterizes the entire switch unit.

The switch unit in each embodiment may be incorporated in a single unit along with the transmitter means described, and which may be mounted as a part of a vehicle wheel, as diagrammatically illustrated in FIG. 1, to form a part of an induction or magnetically activated signaling system described (FIG. 6).

Thus, the improved high-low tire pressure signal switch units of the present invention achieve the objectives stated, eliminate difficulties and drawbacks that have been encountered in prior devices, and solve problems and obtain the new results described.

In the foregoing description, certain terms have been used for brevity, clearness and understanding, but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the switch may be constructed and incorporated in a tire pressure signaling system, the assembly and operation thereof, and the advantageous, new and useful results obtained; the new and useful structures, devices, elements, arrangements and parts are set forth in the appended claims.

I claim:

1. In a vehicle tire pressure signaling system of a type in which magnetically activated alarm circuitry is actuated by a pressure switch, the construction including pressure cylinder means having pressure and contactor ends; rod and O-ring piston means having pressure and switch contactor ends movable in said cylinder means; spring means in the cylinder means reacting between the cylinder and piston means normally biasing the piston means toward the cylinder means pressure end to maintain the piston means in an intermediate position when the pressure ends of the piston and cylinder means are exposed to predetermined desired tire pressure; the cylinder means contactor end having electrical contactors; the piston rod contactor end having contactor means adapted to engage the cylinder means contactors in switch closed position when the piston means is in intermediate position to provide a circuit through the piston rod; the piston means being movable in the cylinder means in one direction or the other from intermediate position upon change in tire pressure to above or below the said predetermined desired value to establish an open switch condition of the switch contactors and to open the circuit through the piston rod; and means connecting said switch contactors with magnetically activated signaling system circuitry.

2. The construction defined in claim 1 in which the cylinder means is provided with means adapted to extend through a tire rim for mounting the cylinder on the tire rim with the pressure ends of the cylinder and piston means communicating with the interior of a rim-mounted vehicle tire to subject the pressure end of the piston means to tire pressure.

3. The construction defined in claim 1 in which insulating material plug means closes the contactor end of the cylinder means, in which the cylinder contactors are mounted on the plug means in spaced relation; and in which electric conductors connected with the contactors are embedded in the plug means.

4. The construction defined in claim 3 in which the spring means reacts between the plug means and piston means.

5. The construction defined in claim 1 in which the piston rod has spaced annular contactor portions connected through the rod at the rod contactor end; in which the cylinder means contactor end is formed with spaced commutator rings insulated from each other and adapted respectively to contact the piston rod contactor portions when the piston means is in intermediate position.

6. The construction defined in claim 5 in which the spaced piston rod contactor portions are separated by a reduced neck between the contactor portions.

7. The construction defined in claim 5 in which the spaced piston rod contactor portions are separated by an insulator ring.

8. The construction defined in claim 5 in which the piston means has a piston head at its pressure end carrying the O-ring movable in the cylinder means; in which the piston rod projects to the rod contactor end from the head; in which insulating material plug means closes the contactor end of the cylinder means; in which the spaced commutator rings are carried by said plug means; and in which the spring means reacts between the plug means and piston head.

9. The construction defined in claim 8 in which the spaced piston rod contactor portions are separated by a reduced neck between the contactor portions.

10. The construction defined in claim 8 in which the spaced piston rod contactor portions are separated by an insulator ring.

11. The construction defined in claim 8 in which the plug means is formed with an internal bore; in which the piston rod contactor end projects into the bore; and in which the spaced commutator rings are located in the bore adjacent the piston rod contactor end.

12. The construction defined in claim 8 in which the plug means is formed with a T-shaped head; and in which a transmitter reed switch and inductor coil means are located in said T-head electrically connected by conductor means embedded in the T-head with the commutator rings.

13. The construction defined in claim 12 in which the plug means also is formed with an internal bore; in which the piston rod contactor end projects into the bore; and in which the spaced commutator rings are located in the bore adjacent the piston rod contactor end.

14. The construction defined in claim 2 in which the means for mounting the cylinder on a tire rim includes a hollow threaded stem on the cylinder means having an open end communicating with the cylinder, nut and lock washer means for clamping the stem to a tire rim, and filter means covering the open end of the stem.

* * * * *